(12) United States Patent
Kim et al.

(10) Patent No.: US 6,310,969 B1
(45) Date of Patent: Oct. 30, 2001

(54) COLOR COORDINATE SPACE STRUCTURE AND COLOR QUANTIZING AND VARIABLE GRAY AREA DESIGNATING METHOD THEREIN

(75) Inventors: Hyeon Jun Kim, Kyungki-do; Jin Soo Lee, Seoul, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/239,528

(22) Filed: Jan. 29, 1999

(30) Foreign Application Priority Data

May 28, 1998 (KR) ................................. 98/19403
Jul. 7, 1998 (KR) ................................. 98/27234

(51) Int. Cl.⁷ ............................................. G06K 9/00
(52) U.S. Cl. .................................. 382/162; 345/604
(58) Field of Search .................... 382/162, 167; 358/518–520; 345/150, 153, 154, 431, 589, 591, 593, 600, 603–605

(56) References Cited

U.S. PATENT DOCUMENTS

| 4,058,828 | 11/1977 | Ladd | 358/80 |
| 5,751,286 | 5/1998 | Barber et al. | 345/348 |

FOREIGN PATENT DOCUMENTS

| 62092074 | 4/1987 | (JP) . | |
| 1314388 | 12/1989 | (JP) . | |
| 3270382 | 12/1991 | (JP) . | |
| 4271483 | 9/1992 | (JP) . | |
| 5236287 | 9/1993 | (JP) . | |
| 1999-81410 | 11/1999 | (KR) | G06T/1/00 |

OTHER PUBLICATIONS

James D. Foley, Andries van Dam, Steven K. Feiner and John F. Hughes; "Computer Graphics: Principles and Practice"; Addison–Wesley Publishing, Inc. ISBNO–201–84840–6; pp. 586–592, Jul. 1997.*
John R. Smith and Shih–Fu Chang; "Tools and Techniques for Color Image Retrieval"; SPIE vol.2670, session 9, pp. 426–437, Mar. 1996.*
Foley, J.D. et al. "Fundamentals of Interactive Computer Graphics" 1982, pp 613–616.
Bach, Jeffrey R. et al. "The Virage Image Search Engine: An open framework for image management", Virage, Inc., San Diego, Ca.
Smith, John R., "Integrated Spatial and Feature Image Systems: Retrieval, Analysis and Compression", Columbia University, 1997.
R.W.G. Hunt; "The reproduction of colour in photography, printing & television;" 1987, Fountain Press, Tolworth, England, pp. 116–122.
J. Timmermans; "Introduction to the Photo CD Video Coding System;" Revue HF, vol. 15, No. 3/4, 1991 pp. 149–168.

* cited by examiner

Primary Examiner—Timothy M. Johnson
(74) Attorney, Agent, or Firm—Fleshner & Kim, LLP

(57) ABSTRACT

A color space structure and quantizing method is disclosed. Upon conversion from the RGB color space into HSV color space, a difference value S' (S'=max–min) is obtained by varying the maximum value of the saturation S in accordance with the value V resulting in a HS'V color space where the difference value S' forms one axis of the color coordinate, such that all of color areas are evenly distributed and the variation of color is uniformly displayed.

20 Claims, 8 Drawing Sheets

COLOR COORDINATE SPACE STRUCTURE AND COLOR QUANTIZING AND VARIABLE GRAY AREA DESIGNATING METHOD THEREIN

BACKGROUND OF THE INVENTION

1. Field of the Invention

The present invention relates to a color space conversion method for an image process, and more particularly to a color conversion from the HSV color space to a new color space.

2. Discussion of Related Art

Currently, extensive research for searching an image based upon the contents is actively being conducted. In response, commercial image searching apparatus and/or applications program are being developed to meet the demand for an improved content based image searching.

The most important information for use in the content based image searching is the color information. Accordingly, an effective performance of an image searching apparatus or applications program depends greatly on an accurate method for extracting the color information.

Generally, the number of different colors which can theoretically be expressed by a computer has been steadily increasing. However, the number of colors which can be displayed by the computer is limited by the available number of quantized colors. A problem arises because the number of quantized colors is less than the number of the colors which can be expressed. Quantization is a procedure of color mapping from M number of colors to N number of colors when M>>N, where M and N are positive integral numbers.

In computers, a color is expressed utilizing the RGB color model based upon the three primary colors of red R, green G, and blue B. However, the RGB space is hardware oriented and a limitation exists in expressing the color changes such that the change can be sensed by the human eye. Thus, the RGB space is often converted into a user oriented HSV color model based upon a hue H, saturation S and value V.

Figure 1A:
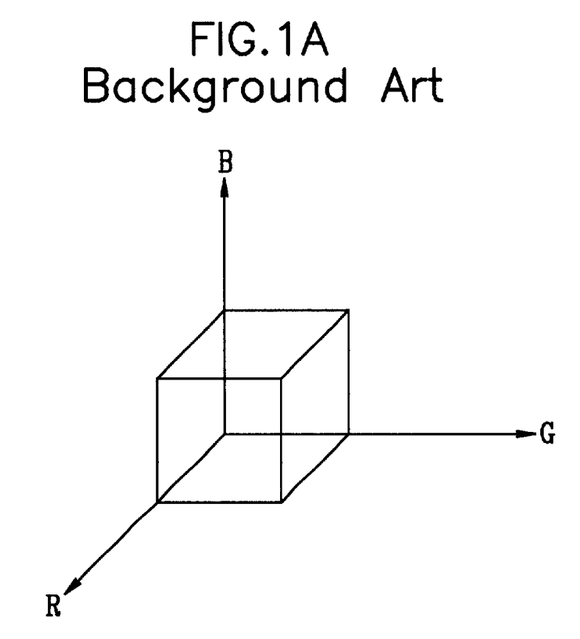
FIGS. 1A and 1B illustrate a method for converting RGB color space into HSV color space in the related art.
Figure 1B:
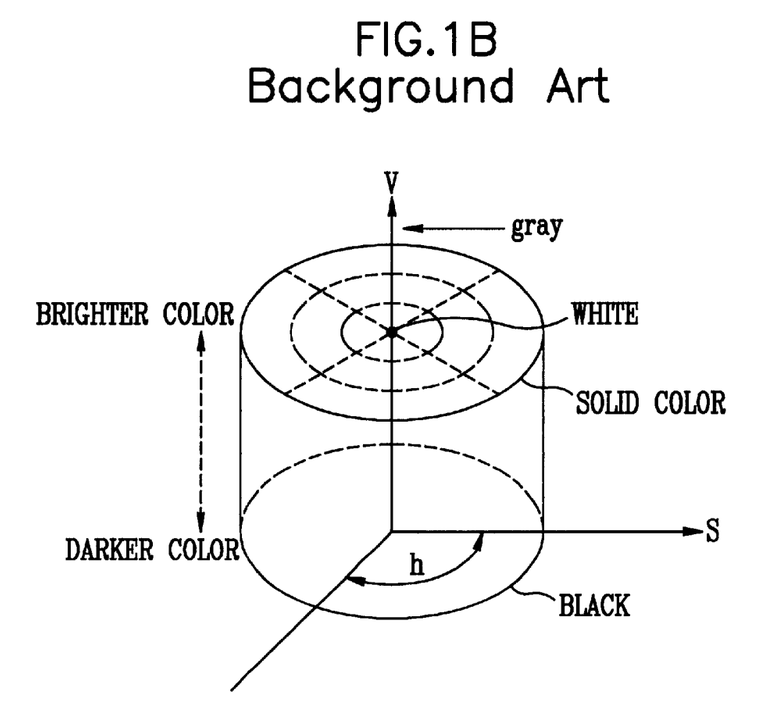

FIGS. 1A and 1B illustrate an existing method for converting the RGB color space into the HSV color space in the related art. The conversion of the RGB color space into the HSV color space is completed by the following; where the values r, g, b, v and s ranges from 0 and 1, and the value h ranges from 0 to 360. Also, if max=min, h is undefined for achromatic color.

$$\max = \text{MAXIMUM}\{r, g, b\}$$
$$\min = \text{MINIMUM}\{r, g, b\}$$
$$v = \max$$
$$s = (\max - \min)/\max$$
$$h = (g - b)/(\max - \min) * 60, \quad \text{if } (r = \max \cap (g - b) > 0)$$
$$(g - b)/(\max - \min) * 60 + 360, \text{ if } (r = \max \cap (g - b) < 0)$$
$$(2.0 + (b - r))/(\max - \min) * 60, \text{ if}(g = \max)$$
$$(4.0 + (r - g))/(\max - \min) * 60, \text{ if}(b = \max)$$

Upon conversion from the RGB color space into the HSV color space, a cylindrical shape results as shown in FIG. 1B. On the cylindrical shape of HSV color space, a gray color is displayed towards the center of circle around the V axis, a solid color is displayed towards the circumference of the circle around the V axis, a brighter (white) color is displayed towards the directions of the axes S and V(+), a darker (black) color in the direction of the axis V(−), and the hue (H) is defined as the angle around the V axis.

However, even within the same HSV space, a range of color variation which can be visually recognized are differently displayed. Also, a simple quantization of the colors in the HSV space does not result in a uniform expression of colors. On the other hand, to quantize the saturation vector value in consideration of the color change sensed by the human eye, many complicated calculations are required. Moreover, selecting a quantization model would be difficulty. Thus, the performance of the content based image searching system using the HSV space deteriorates.

For example, referring to FIG. 1B, the black color is displayed towards the direction of the bottom surface of the cylindrical shape. However, if a color is distributed in the direction of the S axis, it would be difficult to visually differentiate the black color from the distributed color. Thus, even if a color quantization is possible, the color differentiation at low values of V cannot made. Accordingly, a problem still remains.

Figure 2:
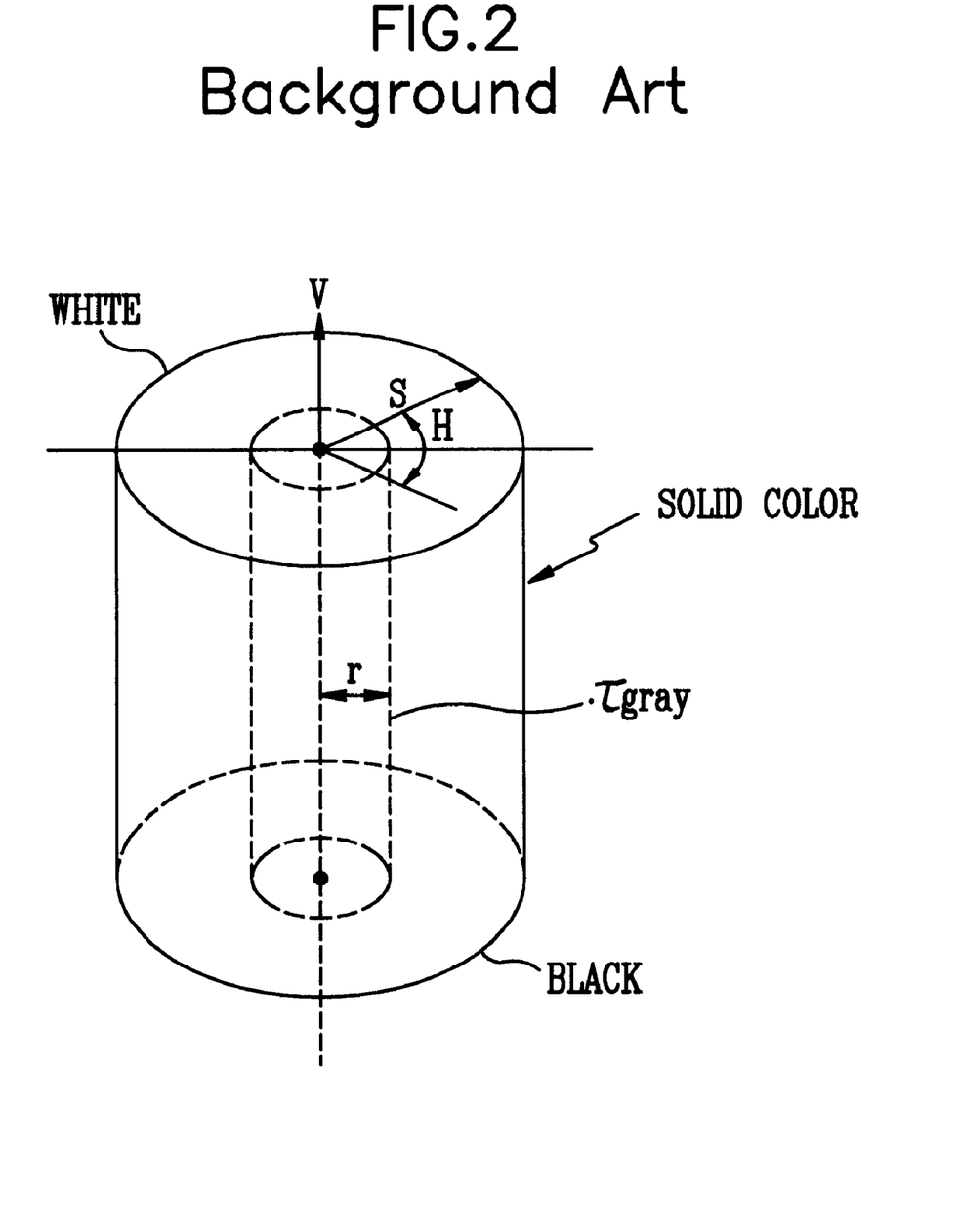
FIG. 2 shows a HSV color space in which a gray area designating method on the conventional HSV color coordinate space is defined.

Therefore, a new color space and a color quantizing method is required in which all of the colors can be distributed in an even manner and the variation of the colors can be uniformly and visually recognized by a user. FIG. 2 is a schematic view illustrating an HSV color coordinate space structure in the prior art.

Referring to FIG. 2, on the cylindrical column of HSV color coordinate space, the value V is the center axis of the cylindrical column, the saturation S is a normal vector from the center axis of the column to concentric circle, and the hue H is the angle around V. To divide a color area and a gray area on the HSV color space, the gray area is designated according to the saturation S. Particularly, a gray value γ is defined as a constant value $\tau_{gray}=\gamma$, such that the gray area if S<$\tau_{gray}$ and the color area if S>$\tau_{gray}$ are divided.

However, taking into consideration the user's visual and sensitive characteristics, the variation of the gray area may be generated by the gray value γ depending also upon the hue H or the value V. Nevertheless, in dividing the color area and the gray area of the conventional HSV color space, the gray area is designated according with only the saturation S of the HSV or the HSI, irrespective of the hue H or the value V. As a result, the color area visually recognizable is really displayed as the gray area.

In such case, unnecessary color signal processing has been added, increasing the loads of the color signal processing. In addition, if the color information to which the color signal process is necessary is in the gray area, the performance of an image search system becomes degraded.

SUMMARY OF THE INVENTION

Accordingly, an object of the present invention is to solve at least the problems and disadvantages of the related art.

An object of the present invention is to provide a new color space upon conversion of RGB color coordinate space into HSV color coordinate space.

Another object of the present invention is provide a color space to evenly distribute all of the color areas while uniformly displaying the color variation in consideration of a user's visual characteristic.

A further object of the present invention is to provide a color quantizing method to improve a content based image search.

Still a further object of the present invention is to provide a variable gray area designating method in which a gray value is variable according to hue H and value V.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a color space according to the present invention is characterized by a reverse conical shape in a three-dimensional space and has color space coordinates comprising the value V in the direction of a longitudinal axis passing the center of the reverse cone, the hue H as the angle 0°–360° around the longitudinal axis passing the center of the reverse cone, and a difference value S' between a maximum value and a minimum value on the shortest linear component in the direction of maximum circumference from the center of the circle.

According to another aspect of the present invention, a color quantizing method includes the steps of converting input RGB color information into the coordinate values on a three-dimensional reverse conical shape of color coordinate space comprised of the coordinates of hue H, a difference value S' and value V, based upon the bigness and/or smallness and the difference value of the RGB color information; area-dividing the coordinate values on the HS'V color coordinate space based upon a predetermined value; and comparing the converted coordinate values and the area-divided values to execute mapping to a representative value.

According to still another aspect of the present invention, a variable gray area designating method in the color coordinate space of the present invention includes the steps of obtaining a gray area according to the luminance for the hue H in dividing a color area and the gray area as image information corresponds with the color coordinate space, and variably changing a reference value for determining the gray area according to each position on the color coordinate space.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 3A:
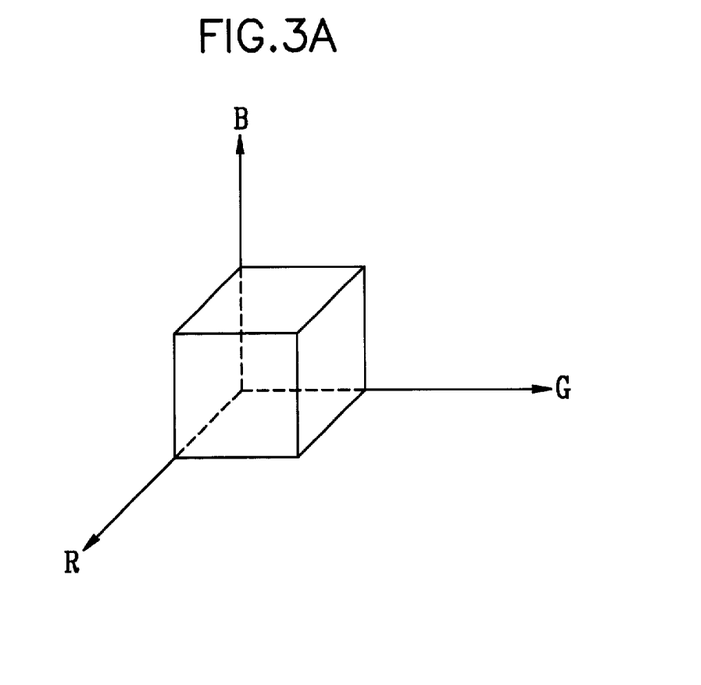
FIGS. 3A and 3B illustrate a color space conversion method according to the present invention.
Figure 3B:
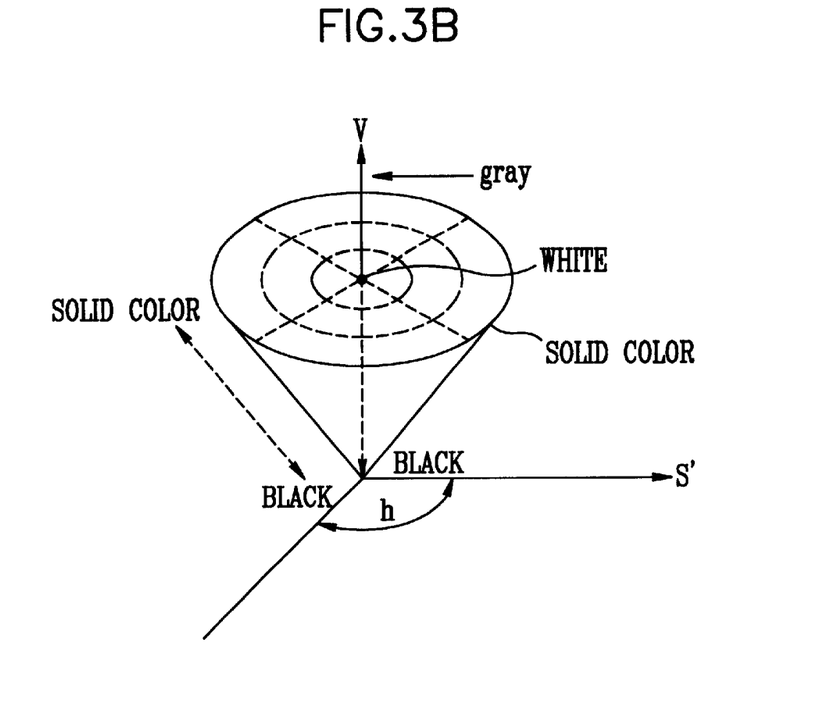
Figure 4A:
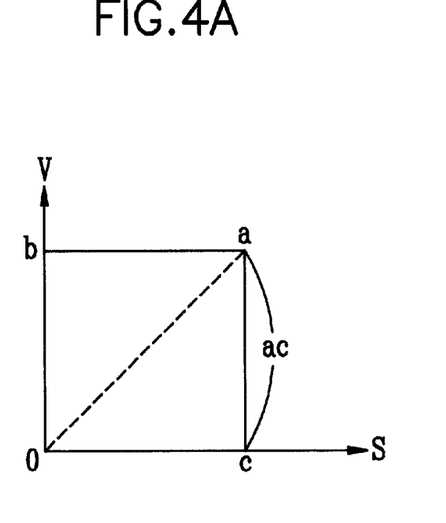
FIGS. 4A and 4B are coordinate views illustrating the color space converting principles embodied according to the present invention.
Figure 4B:
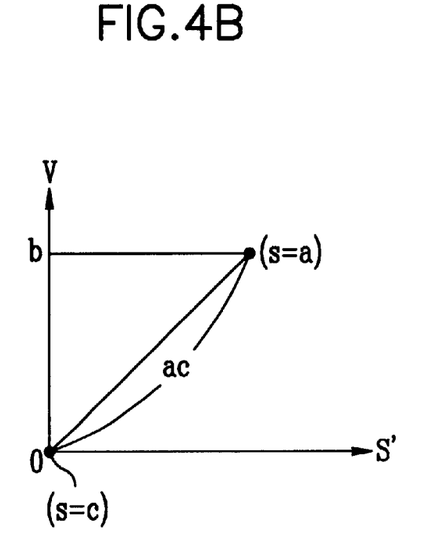

FIGS. 3A and 3B illustrate a color space conversion method according to the present invention. As shown, the existing RGB color coordinate space is converted into a HS'V color space, where S'=max−min. Particularly, S' is defined as a difference between the maximum value and the minimum value in the input r, g and b color information. As shown in FIGS. 4A and 4B, the converted HS'V color coordinate space having 2-dimensional S'-V plane obtains the color value c curved in the direction from the origin O. The conventional HSV color coordinate space having 2-dimensional S-V plane is the longitudinal section passing the center axis of the cylinder.

Referring to FIG. 3B, the converted HS'V color coordinate space is in a reverse conical shape where the apex is at the bottom. The conversion of the RGB color space into the HS'V color space is completed as follows; where r, g, b, v and s ranges from 0 and 1, and the value h ranges from 0 to 360. Also, if max=min, h is undefined for achromatic color.

$$\max = \text{MAX}(r, g, b) = \text{the maximum value from input } r, g, b$$
$$\min = \text{MIN}(r, g, b) = \text{the minimum value from input } r, g, b$$
$$v = \max$$
$$s' = (\max - \min)/\max * \max = s * \max = \max - \min$$
$$h = (g-b)/(\max-\min)*60, \quad \text{if } (r = \max \cap (g-b) > 0)$$
$$(g-b)/(\max-\min)*60 + 360, \text{ if } (r = \max \cap (g-b) < 0)$$
$$(2.0 + (b-r))/(\max-\min)*60, \text{ if } (g = \max)$$
$$(4.0 + (r-g))/(\max-\min)*60, \text{ if } (b = \max)$$

On the HS'V color coordinate space as shown in FIGS. 3A and 3B, color quantizing can be accomplished to satisfy the user's visual and sensitive characteristics. Generally, solid and gray colors are easily distinguished towards white. Thus, the HS'V model maximizes, by a circular plane as the cross section, the diameter and sectional dimension of the portion, where the color discrimination can be easily made.

On the other hand, the solid and gray color cannot be easily distinguished towards black because of the similarity of the color sense for dark colors. Accordingly, the HS'V minimizes, by an apex, the diameter and sectional dimension of the portion where the color discrimination cannot be easily made. Thus, the present invention eliminates the need to perform color index mapping for the portion where the color discrimination cannot be easily made.

After the RGB color space is converted into the HS'V color space, the gray areas of the HS'V color space is designated and the index on various positions of the HS'V color space are mapped as quantizing values.

Figure 5:
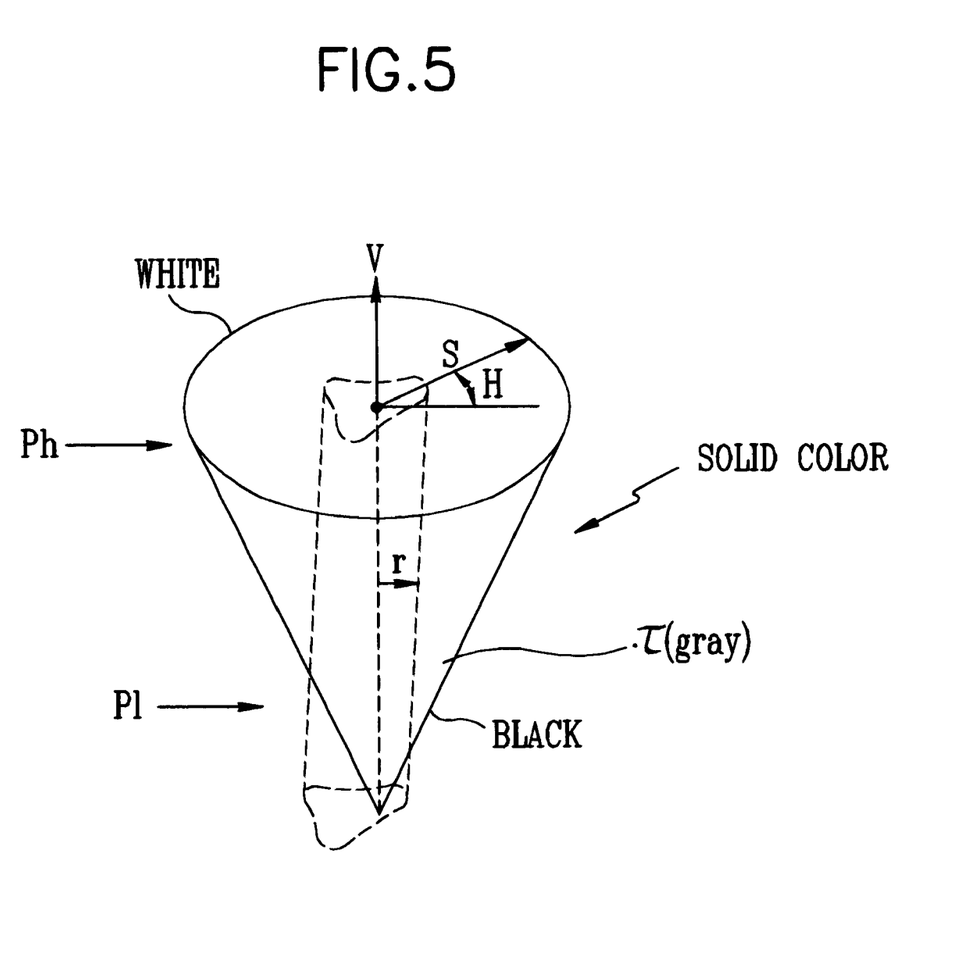
FIG. 5 shows a HSV color space in which a variable gray area designating method according to the present invention is defined.

FIG. 5 shows the HS'V color space structure according to the present invention. The HS'V color space has a reverse conical shape with the apex at the bottom. Similarly to the HSV color space a gray color is displayed towards the center of circle around the V axis, a solid color is displayed towards the circumference of the circle around the V axis, a brighter (white) color is displayed towards the directions of the axes S and V(+), a darker (black) color in the direction of the axis V(−), and the hue (H) is defined as the angle around the V axis.

Because a gray area value $\tau_{gray}$ depends upon the hue, the gray area varies rather than having a fixed cylindrical shape. The gray area at positions Ph and Pl are shown by cross sectional views in FIGS. 6 and 7. Moreover, the variable gray area value $\tau_{gray}$ is obtained from the luminance of the color. Accordingly, after the luminance of colors is detected, the variable gray area value $\tau_{gray}$ is obtained as the proportional value of the detected luminance of the colors.

Figure 6:
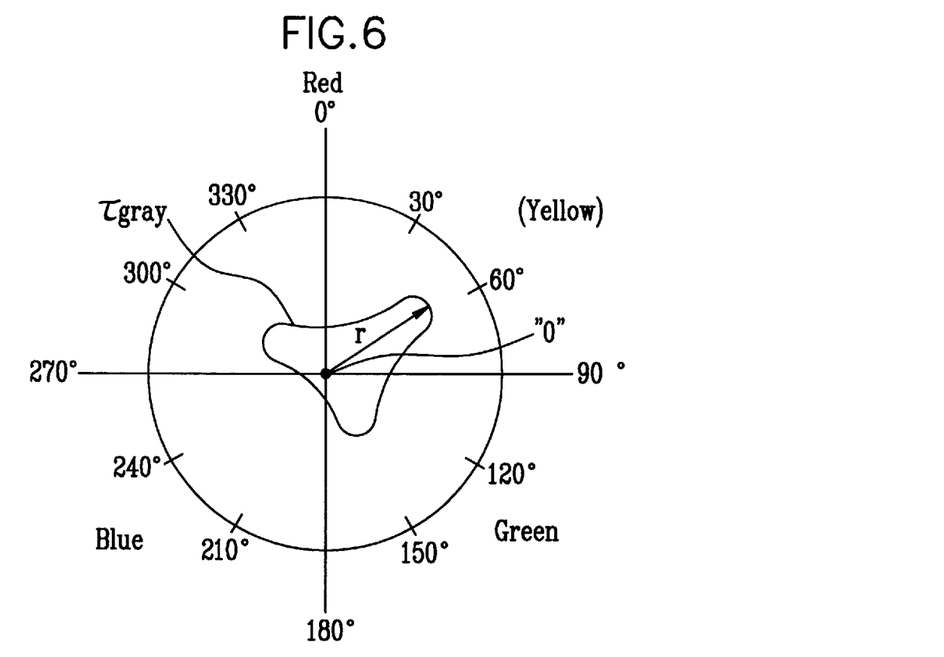
FIG. 6 is a horizontal sectional view at the position 'Ph' in FIG. 5.
Figure 7:
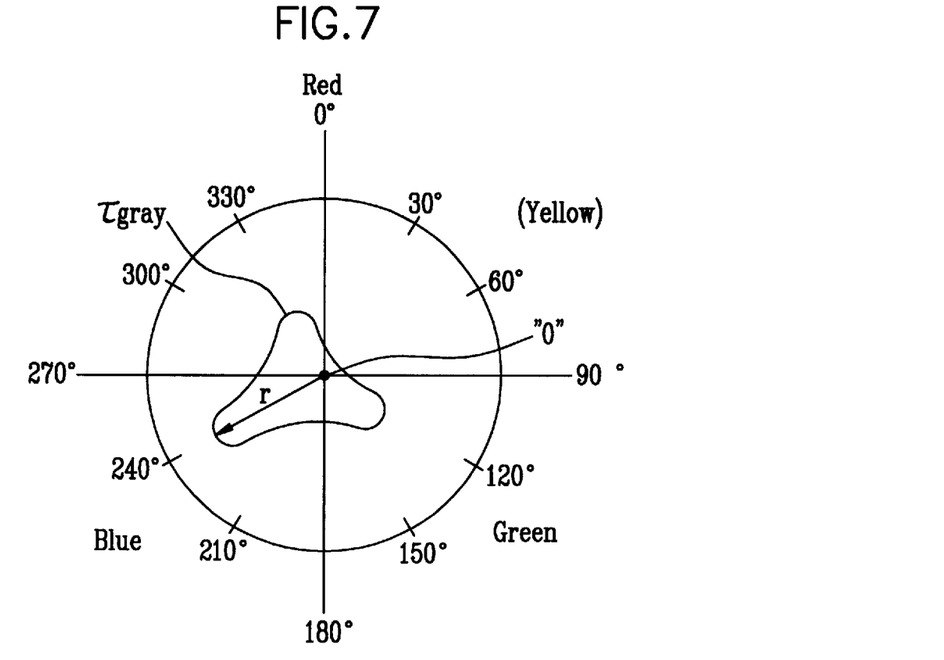
FIG. 7 is a horizontal sectional view at the position 'Pl' in FIG. 5.

As shown in FIG. 6, when the value V is high such as at position Ph, the gray area value $\tau_{gray}$ is large in yellow and small in blue. On the contrary, when the value V is low such as at position Pl shown in FIG. 7, the gray area value $\tau_{gray}$ is small in yellow and large in blue. As a result, a division of the color area and the gray area is possible to satisfy the user's visual and sensitive characteristics.

Figure 8A:
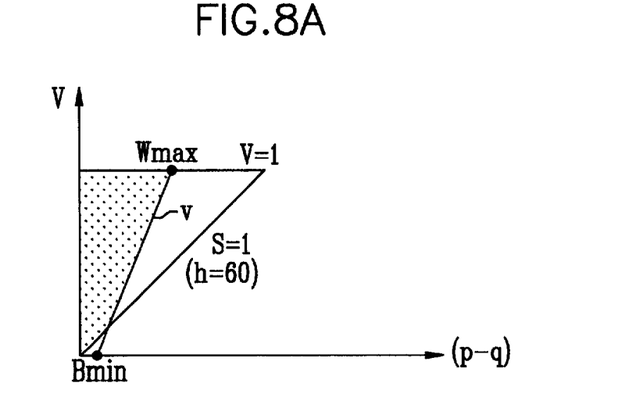
FIGS. 8A to 8C are coordinate views each illustrating a gray area designated on a color plane.
Figure 8B:
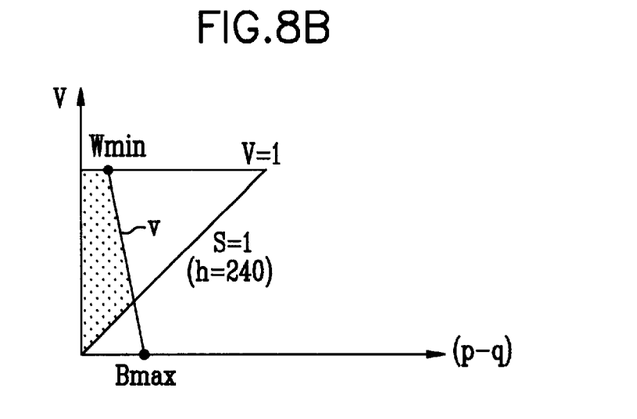
Figure 8C:
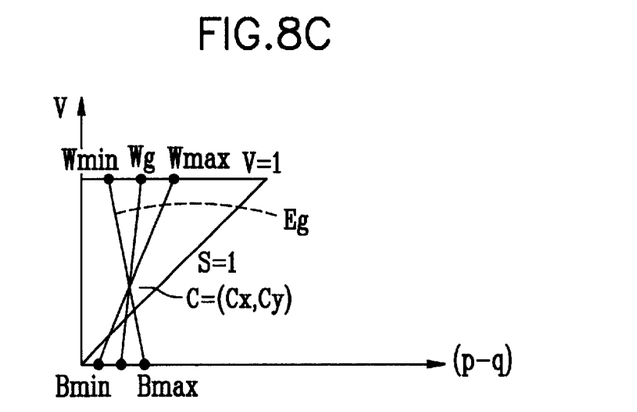

FIGS. 8A to 8C are coordinate views illustrating a gray area designation on a color plane of the HS'V color space. FIG. 8A shows the S-V plane when h=60 degree (for example, yellow), FIG. 8B shows the S-V plane when h=240 degree (for example, blue), and FIG. 8C shows the S-V plane comparing the gray areas designated from the S-V planes of FIGS. 8A and 8B.

In FIGS. 8A to 8C, the following will be assumed, where 0<r,g,b,s,v<1 and 0<h<360:

MAX(r, g, b)=p;
MIN(r, g, b)=q;
a gray discriminating value is Wmin,
  if h=240 degree(blue) and v=maximum value;
a gray discriminating value is Bmax,
  if h=240 degree(blue) and v=minimum value;
a gray discriminating value is Wmax,
  if h=60 degree(yellow) and v=maximum value;
a gray discriminating value is Bmin,
  if h=60 degree(yellow) and v=minimum value;

The point C is the intersection of lines v dividing the gray area from the color area when h=60 degrees and when h=240 degrees, where line v=[1/(Wmin−Bmax)]×(p−q−Bmax), for h=240 and
line v=[1/(Wmax−Bmin)]×(p−q−Bmin), for h=60 and
Point C=(Cx,Cy)=((Wmax×Bmax−Wmin×Bmin)/ (Wmax−Wmin+Bmax−Bmin), (Bmax−Bmin)/ (Wmax−Wmin+Bmax−Bmin))

At h=240 degree(blue), the gray area satisfies the conditions that v<1/(Wmax−Bmax)×(p−q−Bmax), and at h=60 degree(yellow), the gray area satisfies the conditions that v>(Wmax−Bmin)×(p−q−Bmin).

The straight line v for discriminating the gray area at all hue values except for the hues of 60 and 240 degrees passes the intersection point C and has a higher slope than the gray area discriminating line at h=240 degree but lower slope than the gray area discriminating line at h=60 degree.

The straight line can expressed as Eg by obtaining a point Wg (a value between Wmin and Wmax), inclusive of the intersection point C. The expression Eg obtained in FIGS. 8A to 8C is given as v=[(1−Cy)/(Wg−Cx)](p−q)+1−[(1−Cy)/(Wg−Cx)](Wg). The left area of the straight line expression Eg would designate the gray area and the right area as the color area, in FIGS. 8A to 8C.

Thus, the expressions for designating the gray area at arbitrary values of h, s and b are directly obtained from the corresponding r, g and b as follows.

First, luminance Y is obtained from the mathematical expression Y=A1×r+A2×g+A3×b, where coefficients A1, A2 and A3 can be changed by existing experiments. In the preferred embodiment, A1 is designated as 0.299, A2 as 0.587, and A3 as 0.114. The obtained luminance Y is replaced with the following expression, to thereby obtain the point Wg:

Wg=[Wmin, Wmax]=(Y−Ymin)×(Wmax−Wmin)/ (Ymax−Ymin)+Wmin.

In the expression, the relations between Ymax and Wmax and between Ymin and Wmin are determined by the following expressions:

Ymax−0.299+0.587=K1×Wmax,
Ymin=0.114=K2×Wmin where, K1 and K2 each represents a constant.

Accordingly, the gray area V>[(1−Cy)/(Wg−Cx)](p−q)+ 1−[(1−Cy)/(Wg−Cx)](Wg) if [(1−Cy)/(Wg−Cx0]≧0; and the gray area V<[(1−Cy)/(Wg−Cx)](p−q)+1−[(1−Cy)/(Wg−Cx)](Wg) if [(1−Cy)/(Wg−Cx0]<0.

Therefore, the gray area variable value dependent on the hue is obtained from the luminance Y and an explanation of a process for dividing the color area and the gray area utilizing the step of obtaining the gray area variable value will be discussed with reference to FIG. 9. The gray area designation method according to the present invention would also be applicable for the conventional HSV color model.

Figure 9:
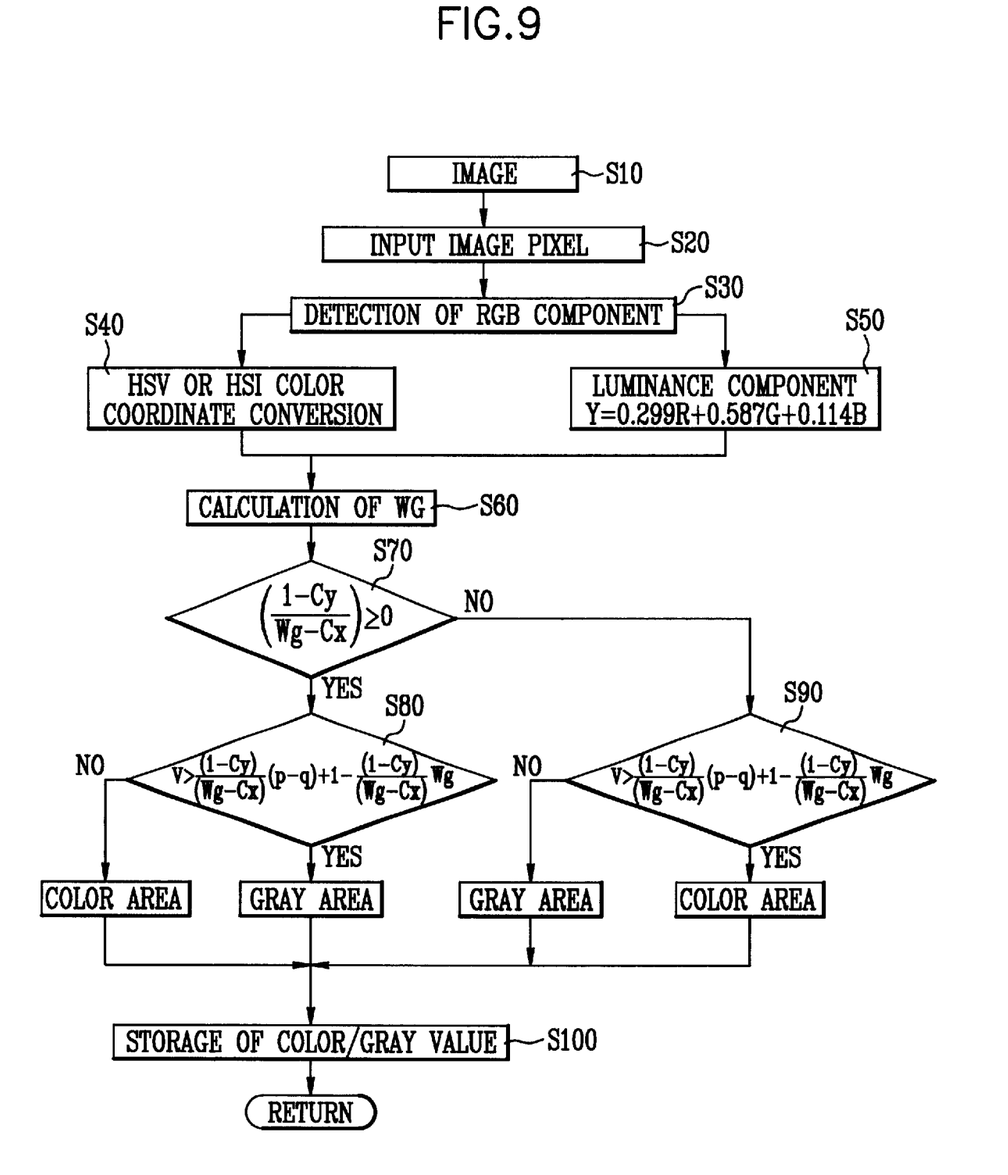
FIG. 9 is a flowchart of a variable gray area designating method on the color coordinate space according to the present invention.

Referring to FIG. 9, an image is input (S10) and the RGB components are detected (S30) from the input image pixels (S20) to convert from the RGB color space into the HS'V (or HSI) color space (S40) and the luminance component Y is calculated (S50) by Y=A1×r+A2×g+A3×b, where A1 is 0.299, A2 is 0.587, and A3 is 0.114. Accordingly, the gray area value is designated with the operation value and the values V and (p−q).

Particularly, the point Wg is obtained (S60) from the luminance value Y to thereby determine whether [(1−Cy)/ (Wg−Cx)≧0 (S70). If the condition is satisfied, a determination is made whether V>[(1−Cy)/(Wg−Cx)](p−q) (S80). If the condition in step S80 is satisfied, a gray area is designated; otherwise, a color area is designated. If the condition in step S70 is not satisfied, a determination is made whether V>[(1−Cy)/(Wg−Cx)](p−q)+1−[(1−Cy)/ (Wg−Cx)](Wg) (S90). If the condition in step S90 is satisfied, a color area is designated; otherwise, a gray area is designated. The designated color and gray areas are stored (S100).

As discussed above, the color space and quantizing method according to the present invention defines a difference value S' (S'=max−min) obtained by varying the maximum value of the saturation S in accordance with the value V; and an index of the corresponding value on the HS'V color space is mapped, eliminating the need to map unnecessary color differences at low values of V.

In addition, a color quantizing method according to the present invention can define a difference value S' on the HSV color coordinate space to pursue color variation between the quantizing areas in an even manner, such that a high efficiency of color quantization can be ensured. Furthermore, a variable gray designating method according to the present invention can vary a reference value for dividing a gray area and a color area according to luminance, upon designation of the gray area, to thereby overcome the conventional problem that the gray area is varied in accordance with the hue and the value.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for converting an input color to a HS'V color model having a reverse conical shape around a V axis and the apex at the bottom, the method comprising:

defining a hue H as the angle around the V axis;

defining a saturation S' as a normal vector of the V axis in the direction from the V axis to the circumference C of the cone; and defining a value V as a vector in the positive direction of the V axis;

wherein the saturation S' ranges between 0 and 1, and wherein the saturation S' of the color model is converted from a RGB color model with (r,g,b) color values by the following equations:

max=the maximum value from input r,g,b
min=the minimum value from input r,g,b
S'=(max−min)/max*max=s*max=max−min.

2. The color model of claim 1, wherein the saturation S' and the value V ranges between 0 and 1; and wherein the hue ranges from 0 to 360.

3. The color model of claim 2, wherein the color model is converted from a RGB color model with (r,g,b) color values by the following equations:

$$\max = \text{the maximum value from input } r, g, b$$

$$\min = \text{the minimum value from input } r, g, b$$

$$v = \max$$

$$s' = (\max - \min)/\max * \max = s * \max = \max - \min$$

$$h = (g - b)/(\max - \min) * 60, \quad \text{if } (r = \max \cap (g - b) > 0)$$
$$(g - b)/(\max - \min) * 60 + 360, \text{ if } (r = \max \cap (g - b) < 0)$$
$$(2.0 + (b - r))/(\max - \min) * 60, \text{ if } (g = \max)$$
$$(4.0 + (r - g))/(\max - \min) * 60, \text{ if } (b = \max)$$
$$\text{undefined}, \qquad \text{if } \max = \min.$$

4. A color model of claim 1, wherein a gray color is displayed towards the center of circle around the V axis, a solid color is displayed towards the circumference C, and a darker color is displayed in the direction towards the apex.

5. A quantization method for the HS'V color space comprising:

(a) designating the gray areas of the HS'V color space, wherein the gray areas change shape for different values of the V color space;

(b) color quantization of the HS'V color space; and (c) index mapping the color information outside the gray areas within each quantized areas to an identical value.

6. A method of claim 5, wherein in step (a), the gray area is defined by a reference value wherein said reference value is proportional to the luminance Y of hue in the HS'V color space.

7. A method of claim 6, wherein the luminance Y is defined by the equation:

Y=A1×r+A2×g+A3×b, where A1, A2 and A3 are predetermined constant values.

8. A method of claim 7, wherein A1 is 0.299, A2 is 0.587, and A3 is 0.114.

9. The method of claim 5, wherein a gray area value $\tau_{gray}$ is not constant and changes according to the hue, wherein a saturation value S' less than $\tau_{gray}$ is within the gray area and the saturation value S' not less than the $\tau_{gray}$ is within a color area of the HS'V color space.

10. The method of claim 5, wherein the designating the gray areas comprises determining the gray areas based on saturation and one of hue and value, and wherein a color area is the remaining areas of the HS'V color space excluding the gray areas.

11. The method of claim 10, wherein the gray areas reduces the color quantization by defining an upper bound to a size of the gray areas.

12. The method of claim 11, wherein processing required for the color quantization is reduced by having the designated gray areas for different levels of the value V in the HS'V color space be variable with a saturation value that is not constant and changes with a hue.

13. The method of claim 5, wherein HS'V color model has a reverse conical shape around a V axis with an apex at the bottom, the HS'V color model comprising:

a hue H defined as the angle around the V axis;

a saturation S' defined as a normal vector of the V axis in the direction from the V axis to a circumference C of the cone; and a value V defined as a vector in the positive direction of the V axis.

14. A method for designating gray areas for a color space defined by hue, saturation, and value, comprising:

designating gray areas according to a reference value, wherein said reference value is proportional to the luminance Y of the hue in the color space, wherein a proportional representation of each of at least three colors determining the color space changes according to the hue;

storing the designated gray areas;

wherein a gray area value $\tau_{gray}$ is not constant and changes according to the hue, and wherein a saturation value (S) less than $\tau_{gray}$ is within the gray area and the saturation value S not less than the $\tau_{gray}$ is not within the gray area.

15. A method of claim 14, wherein the luminance Y is defined by the equation:

Y=A1×r+A2×g+A3×b, where A1, A2 and A3 are predetermined constant values.

16. A method of claim 15, wherein A1 is 0.299, A2 is 0.587, and A3 is 0.114.

17. The method of claim 14, further comprising color quantizing input colors using the color space, wherein processing required for the color quantizing the input colors is reduced for user distinguishable colors by having the designated gray areas for different values of V in a hue, saturation and value (HSV) color model be variable.

18. A color processing system, comprising:

a processor that receives input colors and converts the input color to a corresponding second input color when the input color falls outside a gray area of a color model; and a display that displays the converted second color, wherein the processor converts the input color using a HS'V color conversion model having the shape of a reverse conical shape around a value V axis with the apex at the bottom, wherein the HS'V color conversion model comprises, a hue H defined as the angle around the V axis, a saturation S' defined as a normal vector of the V axis in the direction from the V axis to the circumference C of the cone, wherein the saturation S' ranges between 0 and 1, and wherein the saturation S' of the color conversion model is converted from a RGB color model with (r,g,b) color values by the following equations:

max=the maximum value from input r, g, b min=the minimum value from input r, g, b S'=(max−min)/max*max=s*max=max−min; and
 wherein the value V is defined as a vector in the positive direction of the V axis.

19. The color processing system of claim 18, wherein the color conversion processing of the input colors by the processor is reduced by having variable gray areas for different values of the value V in the HS'V color conversion model, and determining the gray areas of the color conversion model according to saturation, hue and value.

20. The color processing system of claim 19, wherein the variable gray areas are within the saturation S' that is not constant and changes according to 360° of the hue.

* * * * *